US009226325B2

(12) United States Patent
Feki et al.

(10) Patent No.: US 9,226,325 B2
(45) Date of Patent: Dec. 29, 2015

(54) METHOD FOR ATTACHING A USER TERMINAL TO A BASE STATION OF A NETWORK

(75) Inventors: Afef Feki, Nozay (FR); Chung Shue Chen, Nozay (FR); Francois Baccelli, Meudon (FR); Laurent Thomas, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 100 days.

(21) Appl. No.: 14/114,586

(22) PCT Filed: Apr. 5, 2012

(86) PCT No.: PCT/EP2012/056315
§ 371 (c)(1),
(2), (4) Date: Feb. 3, 2014

(87) PCT Pub. No.: WO2012/146476
PCT Pub. Date: Nov. 1, 2012

(65) Prior Publication Data
US 2014/0135003 A1 May 15, 2014

(30) Foreign Application Priority Data
Apr. 29, 2011 (EP) ..................................... 11164377

(51) Int. Cl.
*H04W 4/00* (2009.01)
*H04W 36/00* (2009.01)
*H04W 76/02* (2009.01)
*H04W 48/20* (2009.01)
*H04W 60/00* (2009.01)

(52) U.S. Cl.
CPC .............. *H04W 76/02* (2013.01); *H04W 48/20* (2013.01); *H04W 60/00* (2013.01)

(58) Field of Classification Search
None
See application file for complete search history.

(56) References Cited

U.S. PATENT DOCUMENTS

| 2003/0139197 A1* | 7/2003 | Kostic et al. .................. 455/525 |
| 2003/0236098 A1 | 12/2003 | Hayoun |
| 2004/0156350 A1* | 8/2004 | Brasic et al. .................. 370/346 |
| 2005/0141461 A1* | 6/2005 | Hosein et al. ................. 370/335 |
| 2009/0310505 A1* | 12/2009 | Tsai et al. ..................... 370/252 |
| 2010/0178919 A1 | 7/2010 | Deepak et al. |
| 2013/0072211 A1* | 3/2013 | Cai et al. .................... 455/452.1 |

OTHER PUBLICATIONS

International Search Report for PCT/EP2012/056315 dated Jun. 21, 2012.
European Search Report for EP 11164377.1 dated Oct. 3, 2011.
Chen et al., Self-Optimzation in Mobile Cellular Networks: Power Control and User Association, 2010 IEEE International Conference on Communications (ICC), Cape Town, May 23-27, 2010, 6 pp.
PCT Pat App. PCT/EP2012/056315, Written Opinion of the International Searching Authority, mailed Jun. 21, 2012, 4 pp.

* cited by examiner

*Primary Examiner* — Marivelisse Santiago Cordero
*Assistant Examiner* — Moustapha Diaby
(74) *Attorney, Agent, or Firm* — Fay Sharpe LLP (57) ABSTRACT

A method for attaching a user terminal to a base station of a network is disclosed, said network comprising base stations. The method including defining a global cost function which is a weighted sum of the user terminal transmission delays, over all the user terminals in the network, using a user terminal's context weighting factor representing a user terminal's characteristic; defining a local cost function for each user terminal from said global cost function, said local cost function taking into account said user terminal's context weighting factor for each user terminal, and being a function of the base station to which this user terminal is associated; running a Gibbs sampler with said local cost function for producing user-base station association probabilities; choosing the user-base station association probability which favors low local cost; and attaching said user terminal to a base station according to the user-base station association probability chosen.

20 Claims, 3 Drawing Sheets

DEF_Cw($r_u$, WU(X))

ATTCH(u, b, $\pi_u(b)$ )

DEF_Cu(Cw ; $C_u^w(b)$ )

GIBBS(Cu, V,$\pi_u(b)$; S0) )

SELEC(V, opt(Cw))

FIG.4

METHOD FOR ATTACHING A USER TERMINAL TO A BASE STATION OF A NETWORK

FIELD OF THE INVENTION

The present invention relates to a method for attaching a user terminal to a base station of a network. The invention also relates to a network management for carrying out said method.

Such a method may be used in any network system comprising heterogeneous types of base stations.

BACKGROUND OF THE INVENTION

A method for attaching a user terminal to a base station of a network, also called user association, well known by the man skilled in the art, comprises the step of attaching the user terminal to the closest base station.

One problem of the well-known prior art is that this may lead to unbalanced load, especially among heterogeneous types of base stations (some with low maximum transmit power, and some with high maximum transmit power), when small cells and macro cells co-exist. Another problem is that high-speed user terminals attached to small cells need to handoff frequently which results in extra cost of resources used for handover (for example such as operation overhead during which no data transmission is performed but only handover).

Moreover, it results also in low spectrum utilization efficiency. Indeed, when a user terminal handoffs, there is a time gap due to switching from one base station to the other. In this time gap (duration), data transmission has to be held. For example, if this time gap has to be 1 second, however, the switching/handoff will happen regularly immediately after every 1 second of data transmission, then the time efficiency is only 50% (given by 1 s/2 s).

SUMMARY OF THE INVENTION

It is an object of the invention to provide a method for attaching a user terminal to a base station of a network, which permits to resolve the problems above-mentioned.

To this end, there is provided a method for attaching a user terminal to a base station of a network, said method comprising:
- defining a global cost function which is a weighted sum of the user terminal transmission delays, over all the user terminals in the network, using a user terminal's context weighting factor representing a user terminal's characteristic;
- defining a local cost function for each user terminal from said global cost function, said local cost function taking into account said user terminal's context weighting factor for each user terminal, and being a function of the base station to which this user terminal is associated;
- running a Gibbs sampler with said local cost function for producing user-base station association probabilities;
- choosing the user-base station association probability which favors low local cost; and
- attaching said user terminal to a base station according to the user-base station association probability chosen.

As we will see in further details, the method permits to enhance the user association by taking into account the external user context characteristics of a user terminal within a heterogeneous surrounding cells environment and by performing only local operation to achieve global optimality.

In a first non-limiting embodiment, the user transmission delay is the inverse of user throughput.

In a second non-limiting embodiment, said throughput is defined from the SINR according to the Shannon capacity formula which is equal to:

$$r_u = K \log_e(1+SINR_u),$$

where K is a constant.

In a third non-limiting embodiment, the user-base station association probability to associate a user to a base station $b_0$ is equal to $$\frac{\exp(-C_u^w(b_0)/T)}{\sum_b \exp(-C_u^w(b)/T)},$$

where:
- b is the set of the neighboring base stations for said user;
- $C_u^w(b_0)$ is the local cost function considered at said user terminal when said user is associated with said base station $b_0$;
- T is a parameter which is either a constant or decreases in time.

In a fourth non-limiting embodiment, T is equal to $T_0/\ln(1+t)$, where t is the time and $T_0$ is a constant.

In a fifth non-limiting embodiment, the running of the Gibbs sampler starts with an arbitrary initial state with said user terminal attached to any one of the base stations of the network from which a signal may be received.

In a sixth non-limiting embodiment, the user terminal's characteristic is grade of service and/or the user terminal's velocity.

In a seventh non-limiting embodiment, the grade of service is a data rate, or the jitter.

In a eighth non-limiting embodiment, when the user terminal's context characteristic is the user terminal's velocity, a weighting factor is defined, said weighting factor taking into account the user terminal's velocity and the type of surrounding cells covering the geographic area corresponding to the network.

In a ninth non-limiting embodiment, the user terminal's context weighting factor is defined as being function of:
- a handoff frequency of a user terminal, said handoff frequency depending on the user terminal's velocity, a cell density over the geographic area corresponding to the network and a cell radius;
- a time taken by each handoff of the user terminal; and
- the user's required grade of service.

In a tenth non-limiting embodiment, the local cost function is equal to:

$$C_u^w(b) = \frac{W_u(X)}{P_u}\left(\frac{N_u}{l(b,u)} + \sum_{v \neq u}\frac{\gamma(v,u)P_v \cdot l(b_v,u)}{l(b,u)}\right) + P_u\left(\sum_{v \neq u}\frac{W_v(X)\gamma(u,v)l(b,v)}{P_v \cdot l(b_v,v)}\right)$$

Where:
- $W_u(X)$ is the weighting factor associated to said user terminal;
- $W_v(X)$ is the weighting factor associated to another user terminal;
- $N_u$ is the thermal noise at the user terminal;
- $l(b,u)$ is the path loss of the transmission from a base station to the user terminal;

$P_u$ is the transmission power for the user terminal;

$\gamma(v,u) \cdot P_v \cdot l(b_v,u)$ is the interference to the user terminal from the transmission destined to the other user terminal;

$\gamma(u,v)$ is the orthogonality factor between the user terminal and the other user terminal;

$l(b,v)$ is the path loss of the transmission from the base station to the other user terminal; and $P_v \cdot l(b_v,v)$ is the power of the received signal at the other user terminal from the base station which said other user terminal is attached to.

Therefore, the method applies in downlink.

In an eleventh non-limiting embodiment, the local cost function ($C_n^w$) is equal to:

$$C_u^w(b) = \frac{W_u(X)}{P_u}\left(\frac{N_u}{l(u,b)} + \sum_{v \neq u} \frac{\gamma(v,u)P_v \cdot l(v,b)}{l(u,b)}\right) + P_u\left(\sum_{v \neq u} \frac{W_v(X)\gamma(u,v)l(u,b_v)}{P_v \cdot l(v,b_v)}\right)$$

Where:

$W_u(X)$ is the weighting factor associated to said user terminal;

$W_v(X)$ is the weighting factor associated to another user terminal;

$N_u$ is the thermal noise at the base station of said user terminal;

$l(u,b)$ is the path loss of the transmission from the user terminal to the base station;

$P_u$ is the transmission power of the user terminal;

$\gamma(v,u) \cdot P_v \cdot l(v,b)$ is the interference due to the transmission of the other user terminal applying on the signal transmitted by said user terminal;

$\gamma(u,v)$ is the orthogonality factor between the user terminal and the other user terminal;

$l(u,b_v)$ is the path loss of the transmission from the user terminal to the base station which the other user terminal is attached to; and $P_v \cdot l(v,b_v)$ is the power of the signal received at the base station which is transmitted by the other user terminal.

Therefore, the method applies also in uplink.

In addition, there is provided a network management element for a network apparatus for attaching a user terminal to a base station of a network, said network comprising a plurality of base stations, said network element being adapted to:

defining a global cost function which is a weighted sum of the user transmission delays, over all the users in the network;

using a user terminal's context weighting factor representing the user terminal's characteristic;

defining a local cost function for each user terminal from said global cost function, said local cost function taking into account said user terminal's context weighting factor for each user, and being a function of the base station to which this user is associated;

running a Gibbs sampler with said local cost functions for producing user-base station association probabilities;

choosing the user-base station association probabilities which favors low local cost; and attaching said user terminal to a base station according to the user-base station association probability chosen.

In a first non-limiting embodiment, said network apparatus is a base station.

In a second non-limiting embodiment, said network apparatus is user terminal network apparatus.

In a third non-limiting embodiment, the steps are performed in a distributed way at each user terminal or in a centralized way in the base station.

In addition, there is provided a computer program product, comprising a set of instructions, which when loaded into said computer, causes the computer to carry out the method for attaching a user terminal to a base station of a network, according to any one of the previous characteristics.

BRIEF DESCRIPTION OF THE FIGURES

Some embodiments of methods and/or apparatus in accordance with embodiments of the present invention are now described, by way of example only, and with reference to the accompanying drawings, in which.

DESCRIPTION OF EMBODIMENTS OF THE INVENTION

In the following description, well-known functions or constructions by the man skilled in the art are not described in detail since they would obscure the invention in unnecessary detail.

The present invention relates to a method for attaching a user terminal to a base station of a network. More particularly, said method permits to perform user association.

It is to be reminded that user association stands for the operation of associating a user at time and location to a base station, which will be in charge of serving it and exchanging information/data with it.

In the following description, the terms user terminal or user will be used indifferently.

As will be described hereinafter, the method permits to enhance user association by combining the Gibbs sampler with the external user context (i.e. user terminal's characteristics) including the velocity (e.g. user velocity=low, moderate, or high speed) and service demand (e.g. users may have different data rate requirement) of the user terminals. In addition, the method takes into account the heterogeneous nature of the surrounding cells (e.g. the type of base station is a macro cell or a small cell). Hence, through the establishment of weighing factors, user demand, user terminal velocity and the characteristics of surrounding cells are taken into account. Besides, by defining the attachment method in accordance with the user terminal context as well as the multitude and types of the surrounding base stations, the method may be performed in a distributed way.

Here, "distributed" means that one can and will run the Gibbs sampler with the defined local cost function for himself/herself. However, everybody does so, i.e., the Gibbs sampling is run for every user terminal. When everybody in the network does so following the defined local cost function, the global cost function will be optimized and driven to its minimum provided that a parameter called the temperature is decreased in an appropriate way. In other words, user terminals are working together in a joint activity with local updates (i.e., state transition). Note that this joint activity does not require a centralized control or coordinator. One can find that the collaborative result of the above local updates (in a distributed way) will result in an optimization of the global cost function (the lower, the better). Hence, the joint local updates of user association favor low global cost.

Thus the performance of the whole network is optimized. The distributed method only requires local operation and limited information exchange (among neighboring base stations) for the achievement of global optimality. Each user makes individual decision in choosing its serving base station. Besides, there is no requirement on the order of decision making, i.e. the user association adjustment can be conducted in a distributed and asynchronous manner without a centralized coordinator. This matches today's requirement of self-optimized networks.

Figure 1:
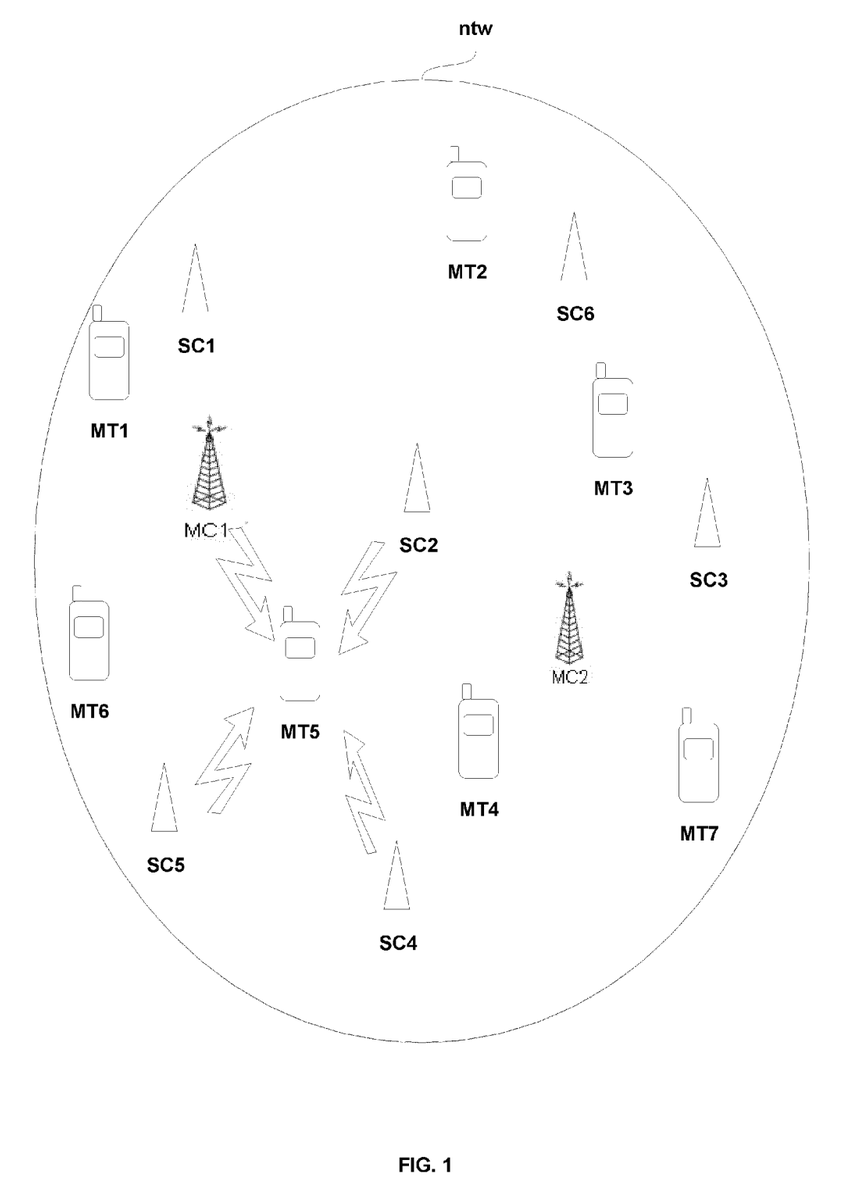
FIG. 1 illustrates a schematic multi-layer network system with small and macro cells, where the method for attaching a user terminal to a base station according to the invention is to be used.

A network NTW, as illustrated in FIG. 1 is composed of:
macro cells MC and small cells SC, one base station being associated to each cell; and
user terminal MT. In a non-limiting embodiment, a user terminal is mobile terminal.

Figure 2:
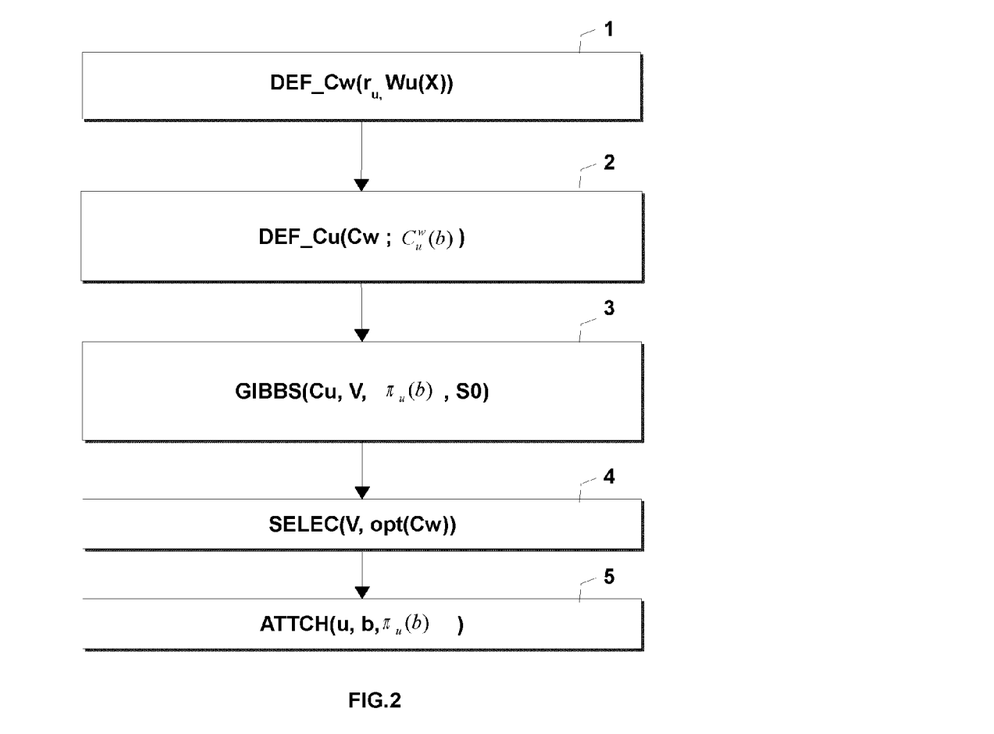
FIG. 2 illustrates a schematic organization chart of the method for attaching a user terminal to a base station according to a non-limiting embodiment of the invention.

The method M for attaching a user terminal u to a base station b of a network NTW, said network comprising a plurality of base stations, said method comprising as illustrated in FIG. 2:
defining a global cost function $C^w$ which is a weighted sum of the user terminal transmission delay, over all the user terminals in the network NTW, using a user terminal's context weighting factor $W_u(X)$ representing a user terminal's characteristic X (step DEF_Cw($r_u$, WU(X)) illustrated in FIG. 2);
defining a local cost function $C_u^w$ for each user terminal u from said global cost function $C^w$, said local cost function $C_u^w$ taking into account said user terminal's context weighting factor $W_u$ for each user u, and being a function of the base station to which this user is associated (step DEF_Cu(Cw, $C_u^w$)) illustrated in FIG. 2);
running a Gibbs sampler with said local cost functions $C_u^w$ for producing user-base station association probabilities (step GIBBS(Cu, V, $\pi_u$(b), S0) illustrated in FIG. 2);
choosing the user-base station association probabilities which favors low local cost (step SELEC(V, opt(Cw) illustrated in FIG. 2); and
attaching said user terminal u to a base station b according to the user-base station association probability chosen $\pi_u$(b) (step ATTCH (u, b, $\pi_u$(b) illustrated in FIG. 2).

Figure 3:
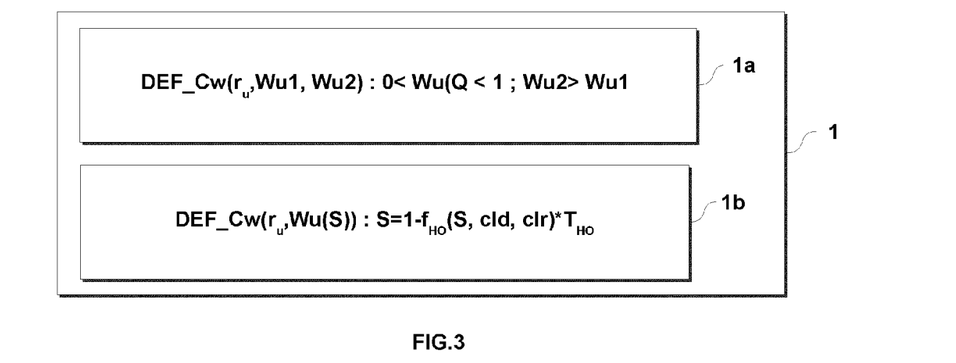
FIG. 3 illustrates a schematic organization chart of a definition step of weighting factor of the method for attaching a user terminal to a base station of FIG. 2.

The attachment method is described in details below.
Reference to FIGS. 2 and 3 will be made.

In a first step 1), as illustrated in FIG. 2, one defines a global cost function $C^w$ which is a weighted sum of the user terminal transmission delays, over all the user terminals in the network NTW, using a user terminal's context weighting factor $W_u(X)$ representing a user terminal's characteristic X.

The user terminal's characteristic X represents the current external context data of the user terminal, such as in a non-limiting example, grade of service, user terminal's velocity.

Hence, one defines a global cost function that incorporates the weighting factors which represent the user terminal's characteristics (e.g., grade of service and user terminal's velocity as described later in the description) and reflect the preference in low handoff frequency and higher radio spectrum (or bandwidth) utilization efficiency.

For a balance between throughput enhancement and also bandwidth sharing fairness among users, one aims at minimizing the network's aggregate transmission delay instead of the sum of throughputs, i.e. $\Sigma_u D_u$, where $D_u$ is the transmission delay experienced by user terminal u in the network and $$D_u = \frac{1}{r_u}.$$

It is to be reminded that the objective of the above minimization is to minimize the overall potential delay of the data transfers in progress in the network NTW. This (minimizing the overall potential delay) provides an intermediate solution between max-min and proportional fairness, penalizing long routes less severely than the latter. It is to be noted that in the case of max-min fairness, the performances such as the throughput, SINR, etc. will be the same for a user terminal at the center of a cell than for a user terminal at the border of the cell, but in the case of proportional fairness it won't be the case, neither in the case of the above minimization.

Therefore, the cost function chosen minimizes the sum of the inverse of throughput, or equivalently the total delay to send an information unit to all users, which penalizes very low throughputs.

Hence, the following global cost function, which is the network's weighted aggregate transmission delay, is defined as:

$$C^w = \sum_{u \in U} \frac{W_u(X)}{r_u} \quad [1]$$

Where U is the set of user terminals to be served by the set of base stations in the network NTW.

Under the additive white Gaussian noise (AWGN) model, the throughput (also called data rate) in bits/s/Hz at the user terminal u is defined by $r_u = K \log_e(1+SINR_u)$ [2], where K is a constant. K depends on the width of the frequency band allocated to the user terminal u.

Therefore, the global cost function $C^w$ is defined as:

$$C^w = \sum_{u \in U} \frac{W_u(X)}{e^{\frac{r_u}{K}} - 1} = \sum_{u \in U} \frac{W_u(X)}{SINR_u} \quad [3]$$

This global cost function emulates the potential delay fairness.

It is to be noted that $C^w$ will be the global energy of the Gibbs sampler.

Therefore, in a non-limiting embodiment, the user transmission delay is the inverse of user throughput $r_u$ and said throughput $r_u$ is defined from the SINR (Signal to Interference plus Noise Ratio) according to the Shannon capacity formula which is equal to:

$$r_u = K \log_e(1+SINR_u), \quad [4]$$

where K is a bandwidth constant.

As for the optimization, the constant K does not have any impact, one may ignore this constant. This is done in the following description.

Hence, with this formula, one can have an indication of the throughput obtained at the user terminal u.

It is to be noted that for each user terminal, one assumes that there is a pair of orthogonal channels for uplink (from the user terminal to a base station) and downlink (from a base station to the user terminal) communications respectively.

Since there is no interference between the uplink and the downlink, for simplicity, one considers initially only the downlink.

1. Downlink

Therefore, for a user terminal u and a base station b, the SINR at u is expressible as:

$$SINR_u = \frac{P_u \cdot l(b_u, u)}{N_u + \sum_{v \in U, v \neq u} \gamma(v, u) P_v \cdot l(b_v, u)} \quad [5]$$

where:
U is the set of user terminals u which are served by a set of base stations b of the cellular radio network NTW;
$b_u$, is the serving base station of user terminal u;
$P_u$ is the transmission power for the user terminal u;
$l(b_u, u)$ is the path loss of the transmission from the base station $b_u$ to the user terminal u;
$N_u$ is the thermal noise at the user terminal u (also called receiver noise);
$\gamma(v,u) \cdot P_v \cdot l(b_v, u)$ is the interference to the user terminal u from the transmission destined to another user terminal v.

By substituting the above $SINR_u$ expression [5] into [4], one obtains [6]:

$$C^w = \sum_{u \in u} W_u(X) \frac{N_u + \sum_{v \in u, v \neq u} \gamma(v, u) P_v \cdot l(b_v, u)}{P_u \cdot l(b_u, u)}$$

$$= \sum_{u \in u} \frac{W_u(X) \cdot N_u}{P_u \cdot l(b_u, u)} + \sum_{\{u,v\} \subseteq u}$$

$$\left( \frac{W_u(X) \cdot \gamma(v, u) P_v \cdot l(b_v, u)}{P_u \cdot l(b_u, u)} + \frac{W_v(X) \cdot \gamma(u, v) P_u \cdot l(b_u, v)}{P_v \cdot l(b_v, v)} \right). \quad [6]$$

Where:
$\gamma(v,u)$ is the orthogonality factor on the transmission signal destined to the other terminal v;
$P_v \cdot l(b_v, u)$ is the power of interference at the user terminal u due to the signal transmitted to the user terminal v. In other words, it is the signal transmitted to/for the user terminal v by its base station $b_v$. it is to be noted that "its station" means the base station to which said user terminal v is attached to.

It is to be noted that the throughput and the SINR can be calculated with other methods than Shannon.

In non-limiting embodiments, one or a plurality of characteristics X are taken into account.

Characteristic X is a Grade of Service.

In a first non-limiting embodiment, the characteristic X is a grade of service Q. In variants of this non-limiting embodiment, the grade of service Q is a data rate or the jitter.

As user terminals may have different service demands, one takes into account this user terminal's characteristic.

When the grade of service is a data rate, in a non-limiting example a low or high data rate, one defines two corresponding weighting factors $W_{u1}$ for Q equal to low rate, and $W_{u2}$ for Q equal to high rate such that $W_{u2} > W_{u1}$ where $0 < W_u(Q) < 1$ as illustrated in FIG. 3 (step 1a) DEF_Cw($r_u$, Wu1, Wu2)).

Characteristic X is the User Terminal's Velocity S

In a second non-limiting embodiment, the characteristic X is a user terminal's velocity S.

User terminals may have different mobility, such as in a non-limiting example low or high velocity. From the viewpoint of handoff, it is preferable if a user with high velocity is associated with macro cell instead of small cell for the reason that attaching to small cell could lead to frequent handoffs and consequently service and/or system instability, therefore, one takes into account this user terminal's characteristic.

In this case, one defines a weighting factor $W_u(S)$, said weighting factor $W_u(S)$ taking into account the user terminal's velocity S and the type of surrounding cells CI covering the geographic area corresponding to the network NTW.

If one considers that in conventional cellular networks, macro and small cells are deployed in overlay-underlay or disjoint architecture and that cells are uniformly and randomly distributed in the geographical service area, by the cell density (say, macro cell density and small cell density) and cell radius (say, macro cell radius and small cell radius), one can estimate the corresponding average number of handoffs required per time period, respectively, given the user velocity.

In non-limiting examples, macro cells have coverage around 1 km and small cells have coverage around 100-200 m.

It is to be reminded that an overlay-underlay network is composed of a macro cellular network in a geographical area on which another (for example small, micro or pico) cellular network is built, such as in a non-limiting example a GSM network built on top of a CDMA network, both providing a macro and small coverage at the same time).

Therefore, when the user terminal's velocity S is low or high, the weighting factor $W_u(S)$ is defined as being function of (as illustrated in FIG. 3 (step 1b) DEF_Cw ($r_u$, Wu(S))):
a handoff frequency $f_{HO}$ of a user terminal u, said handoff frequency depending of the user terminal's velocity S, the cell density $cl_d$ over the geographic area corresponding to the network NTW and the cell radius $cl_r$.
a time taken $T_{HO}$ by each handoff of the user terminal u. It is to be noted that the cost (time taken) by each handoff is known standard and is a constant. In a non-limiting example, this time $T_{HO}$ is equal to 1 second in the 3G standard.

Hence, in a non-limiting example, $W_u(S)=1-f_{HO}(S, cl_d, cl_r)*T_{HO}$, such that $0 \leq W_u(S) \leq 1$ and with $T_{HO} > 0$.

The weighting factor $W_u(S)$ represents the effective time for throughput, which is the utility time to transmit data when there is no handoff.

In a second step 2), one defines a local cost function $C_u^w$ for each user terminal u from said global cost function $C^w$, said local cost function $C_u^w$ taking into account said user terminal's context weighting factor $W_u$ for each user terminal u, and being a function of the base station to which this user terminal is associated.

From [6], one defines the following local cost function $C_u^w(b)$ for each user terminal u such that:

$$C_u^w(b) = \frac{W_u(X) N_u}{P_u \cdot l(b, u)} + \sum_{v \neq u} \frac{W_u(X) \gamma(v, u) P_v \cdot l(b_v, u)}{P_u \cdot l(b_u, u)} + \quad [7]$$

$$\sum_{v \neq u} \frac{W_v(X) \gamma(u, v) P_u \cdot l(b, u)}{P_v \cdot l(b_v, u)}$$

$$= \frac{W_u(X)}{P_u} + \left( \frac{N_u}{l(b, u)} + \sum_{v \neq u} \frac{\gamma(v, u) P_v \cdot l(b_v, u)}{l(b_u, u)} \right) +$$

$$P_u \left( \sum_{v \neq u} \frac{W_v(X) \gamma(u, v) l(b_u, v)}{P_v \cdot l(b_v, v)} \right)$$

where:
$W_u(X)$ is the weighting factor associated to said user terminal u;

$W_v(X)$ is the weighting factor associated to another user terminal v;

$N_u$ is the thermal noise at the user terminal u;

$l(b,u)$ is the path loss of the transmission from a base station b to the user terminal u;

$P_u$ is the transmission power for the user terminal u;

$\gamma(v,u) \cdot P_v \cdot l(b_v, u)$ is the interference to the user terminal u from the transmission destined to the other user terminal v;

$\gamma(u,v)$ is the orthogonality factor between the user terminal u and the other user terminal v;

$l(b,v)$ is the path loss of the transmission from the base station b to the other user terminal v; and $P_v \cdot l(b_v, v)$ is the power of the received signal at the other user terminal v from the base station $b_v$ which said other user terminal v is attached to.

It is to be noted that the user terminal v could be any user terminal including u.

[7] can be expressed as $$C_u^w(b) = \frac{\tilde{A}_u(b)}{P_u} + \tilde{B}_u(b) P_u$$

which is a function of b. [8]

Where:

$$\tilde{A}_u(b) = W_u(X)\left(\frac{N_u}{l(b,u)} + \sum_{v \neq u} \frac{\gamma(v,u) P_v \cdot l(b_v, u)}{l(b,u)}\right)$$

that is to say $$\tilde{A}_u(b) = \frac{P_u}{\text{SINR}_u}$$

and $$\tilde{B}_u(b) = \sum_{v \neq u} \frac{W_v(X) \gamma(u,v) l(b,v)}{P_v \cdot l(b_v, v)}$$

It is to be noted that the term $\tilde{A}_u(b) P^{-1}$ can be seen as the "selfish" part of the energy or cost which is small if the SINR of the user terminal u is large. In other words, it tells how good the signal received by the user terminal u is compared to the other user terminal v.

The term $\tilde{B}_u(b) P$ can be seen as the "altruistic" part of the energy or cost, which is small if the power of interference incurred by all the other terminal users (i.e. v≠u) because of P is small compared to the power received from their own base stations $b_v$. In other words, it tells how much damages the user terminal u can do to other user terminals v.

It is to be noted that the local cost function $C_u^w$ is a function of b, said feature being used as described further in the description.

Characteristic X is a Grade of Service.

When the characteristic X is a grade of service Q, from [7], one defines a local cost function $C_u^w$ such that:

$$C_u^w(b) = \frac{W_u(Q)}{P_u}\left(\frac{N_u}{l(b,u)} + \sum_{v \neq u} \frac{\gamma(v,u) P_v \cdot l(b_v, u)}{l(b,u)}\right) + P_u\left(\sum_{v \neq u} \frac{W_v(Q) \gamma(u,v) l(b,v)}{P_v \cdot l(b_v, v)}\right)$$

which corresponds to the global cost function:

$$C_1^w = \sum_{u \in U} \frac{W_u(Q)}{e^{r_u/K} - 1}$$

Characteristic X is the User Terminal's Velocity S

When the characteristic X is the user terminal's velocity S, one defines a local cost function $C_u^w$ such that:

$$C_u^w(b) = \frac{W_u(S)}{P_u}\left(\frac{N_u}{l(b,u)} + \sum_{v \neq u} \frac{\gamma(v,u) P_v \cdot l(b_v, u)}{l(b,u)}\right) + P_u\left(\sum_{v \neq u} \frac{W_v(S) \gamma(u,v) l(b,v)}{P_v \cdot l(b_v, v)}\right)$$

which corresponds to the global cost function:

$$C_2^w = \sum_{u \in U} \frac{W_u(S)}{e^{r_u/K} - 1}$$

Of course, in a non-limiting embodiment, the characteristics Q and S may be combined together, such that:

$$C_u^w(b) = \frac{W_u(Q) W_u(S)}{P_u}\left(\frac{N_u}{l(b,u)} + \sum_{v \neq u} \frac{\gamma(v,u) P_v \cdot l(b_v, u)}{l(b,u)}\right) + P_u\left(\sum_{v \neq u} \frac{W_v(Q) W_v(S) \gamma(u,v) l(b,v)}{P_v \cdot l(b_v, v)}\right)$$

which corresponds to the global cost function:

$$C_3^w = \sum_{u \in U} \frac{W_u(Q) W_u(S)}{e^{r_u/K} - 1}$$

In a third step 3), one runs a Gibbs sampler with said local cost function $C_u^w$ for producing user-base station association probabilities.

It is to be noted that the Gibbs sampler (or Gibbs sampling) is a sampling method to generate a sequence of samples from the probability distribution of one or more random variables. It is a stochastic method (i.e. a method that makes use of random numbers, here, the random variable is b, and the state transition is not in a deterministic approach but in a probabilistic approach governed by the probability distribution $\pi_u(b)$).

As the local cost function $C_u^w$ is a function of b, one samples a random variable b on the set of base stations b (i.e. the set of neighboring base stations) according to a probability distribution described hereinafter.

As described hereinafter, when running the Gibbs sampler for all the user terminals, one obtains for each user terminal a base station b to which it can be attached, said base station being chosen according to the probability distribution obtained.

In a non-limiting embodiment, the user-base station association probability $\pi_u(b)$ to associate a user terminal u to a base station b is equal to:

$$\frac{\exp(-C_u^w(b)/T)}{\sum_b \exp(-C_u^w(b)/T)},$$

where:
- b is the set of the neighboring base stations for said user terminal u;
- $C_u^w(b)$ is the local cost function considered at said user terminal u when said user terminal u is associated with said base station b; and
- T is a parameter called the temperature which is either a constant or decreases in time.

It is to be noted that this probability distribution favors low costs.

In a first non-limiting embodiment, the temperature T is a constant.

In a second non-limiting embodiment, the temperature T decreases in time and is equal to $T_0/\ln(1+t)$, where t is the time and $T_0$ is a constant.

When T is a constant, the network will converge to a stationary distribution which favors low energy states. In other words, the network will be driven to a network configuration which has a low energy. This resulting energy (cost) may not be a global minimum point.

It is to be noted that by conducting annealing, that is to say when T decreases in time and is equal to $T_0/\ln(1+t)$ where t is the time, one guarantees convergence to an optimal configuration of minimal global cost $C^w$. The network will be driven to a state of minimal energy (i.e. global cost function). In other words, the network will be driven to a global minimum point.

Gibbs Sampler

As will be described below, Gibbs sampler means that the state transition refers to user-base station association, where the probability distribution follows the Gibbs's defined probability $\pi_u(b)$.

In a non-limiting embodiment, the Gibbs sampler operates on the graph G defined below:
- the set of nodes of the graph is the set of user terminals u;
- each node has a state which is its user-base station association;
- the set of neighbors of node u in this graph is the set of all users v≠u such that the power of the signal received from the base station $b_v$ at user terminal u is above a specific threshold θ.

Through information exchange between neighboring base stations, the local cost function $C_u^w(b)$ to determine $\pi_u(b)$ are evaluated as follows.

A state transition is based on the local cost function $C_u^w(b)$. So the base station $b_u$ needs to gather some information to determine the coefficients of $C_u^w(b)$. To do so, each user v∈U reports the following data to its base station $b_v$:
(a) Its $SINR_v$;
(b) The power of its received signal, i.e. $P_v \cdot l(b_v, v)$; and
(c) The power of the signal received from the other base stations, i.e. $\gamma(u,v) P_u \cdot l(b_u,v)$.

From the collected information, each base station $b_u$ is able to compute the local cost function $C_u^w(b)$.

When running the Gibbs sampler, one starts with an arbitrary initial state S0 with a user terminal u randomly selected. Then, one runs the Gibbs sampler to decide to which base station b the user terminal u will be attached. The Gibbs sampler is performed for each user terminal randomly chosen. This results in at least one user-association probability $\pi_u(b)$, such that $\pi_u(b)=1$, or this results in a plurality of user-association probabilities $\pi_u(b)$, such that $0<\pi_u(b)<1$, for each b.

Therefore, the result is a probability distribution (set of $\pi_u(b)$) describing the probabilities that the user-base station association should be selected.

As a result, in each state transition, the Gibbs sampler samples a random variable b having more likely a small local cost function.

It is to be noted that as the global cost function is finally expressible as a sum of the inverse of SINR, the Gibbs sampler can be used with a guarantee of optimal performance.

It is to be noted that in a non-limiting example, the Gibbs sampler is run in the base station b since base station is computationally more powerful and with more resources.

In another non-limiting embodiment, it is applicable if one may wish to implement and run it the user terminal if there is no resource limitation problem or possible constraints.

In a fourth step 4), one chooses the user-base station association probability $\pi_u(b)$ which favors low local cost.

This selection is performed according to the probability distribution (set of $\pi_u(b)$) obtained before.

In a non-limiting example, if a user terminal has two possible choices of base stations, say b1 and b2, which correspond to said user-base station association probability 0.9 and 0.1, respectively, as a result, said user-base station association probability 0.9, and therefore said base station b1 will be chosen with a higher probability (i.e., 0.9).

Said user-association probability chosen $\pi_u(b)$ corresponds to a base station b.

Therefore, in a fifth step 5), one attaches said user terminal u to a base station b according to the user-base station association probability chosen $\pi_u(b)$.

These steps 3, 4, and 5 are iterated with all the other user terminals randomly selected.

It is to be noted that in practice, the network is dynamic, that means that the attachment method will run all the time, i.e. continuously to tune and adapt the network. Therefore, the optimization will not stop.

It is to be noted that when the user terminal u is attached to a base station b, the value of the SINR changes. It means that the local cost function $C_u^w$ changes (especially the interference element of the local cost function) each time the user terminal u is attached to a different base station b, this means at each iteration when running the Gibbs sampler.

After running the Gibbs sampler, the result is: for each user terminal, a selected base station b to which a terminal may be attached (based on a local cost function); the whole set of user-base station association in the network will result in an optimal global cost.

Hence, this attachment method permits to optimize automatically the global cost function $C^w$ by running Gibbs sampler with the local cost function $C_u^w$ (as the global cost function Cw is the sum of all the local cost function $C_u^w$), taken into account user terminal's context characteristic such as a grade of service Q and the user terminal's velocity S within an heterogeneous network NTW (which comprises macro and small cells).

It may be performed in a distributed way and optimizes the performance of the whole network. Therefore, it is a fully distributed approach which optimize the global cost function.

Hence, the user association procedure is defined in accordance with the mobile user's characteristics (grade of service+mobile velocity) as well as the multitude and types of the surrounding base stations.

Figure 4:
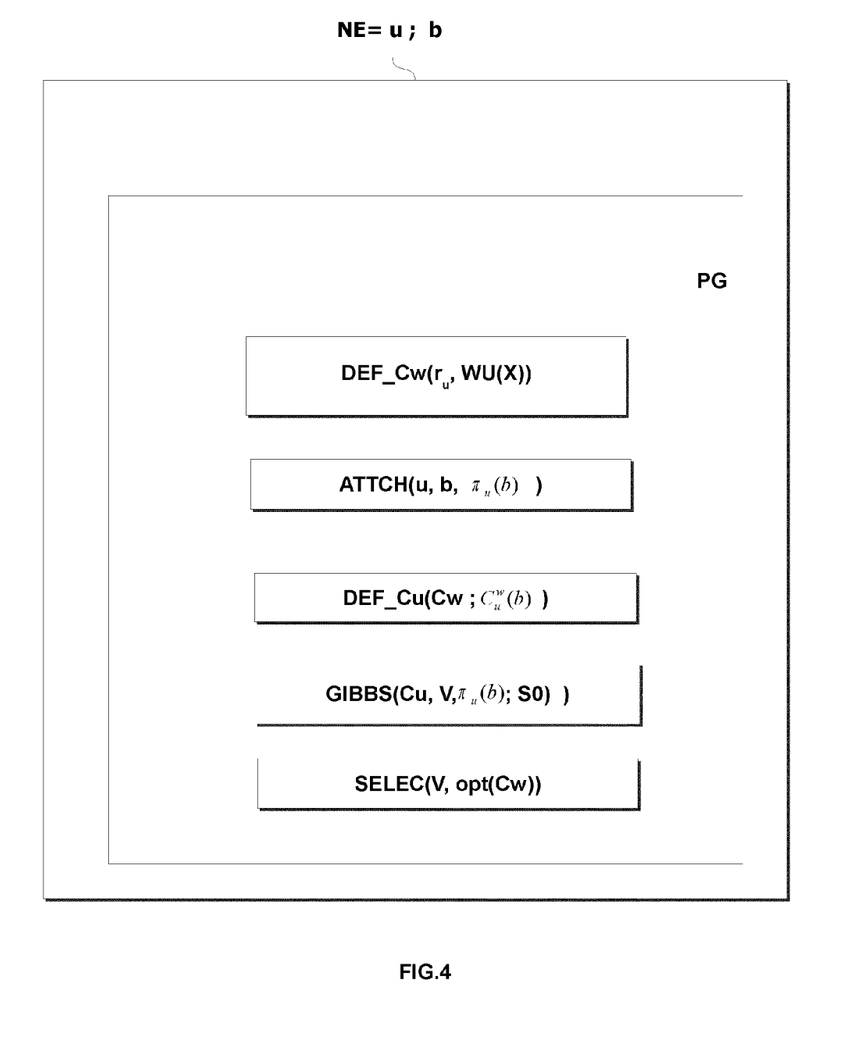
FIG. 4 illustrates schematically a network management element which is adapted to carry out the method for attaching a user terminal to a base station of FIG. 2.

The attachment method is carried out by a network apparatus NE for attaching a user terminal u to a base station b of a network NTW, said network NTW comprising a plurality of base stations b, as illustrated on FIG. 4.

Said network apparatus NE is adapted to:
- define a global cost function $C^w$ which is a weighted sum of the user terminal transmission delay, over all the user terminals in the network NTW, using a user terminal's context weighting factor $W_u(X)$ representing user terminal's characteristic X;
- define a local cost function $C_u^w$ for each user terminal u from said global cost function $C^w$, said local cost function $C_u^w$ taking into account said user terminal's context weighting factor $W_u$ for each user terminal u, and being a function of the base station to which this user terminal is associated;
- run a Gibbs sampler with said local cost function $C_u^w$ for producing user-base station association probabilities $\pi_u(b)$;
- choose the user-base station association probability $\pi_u(b)$ which favors low local cost; and
- attaching said user terminal u to a base station b according to the user-base station association probability $\pi_u(b)$ chosen.

In a first non-limiting embodiment, said network apparatus NE is a base station b. In this case, the attachment method is performed in a centralized way.

In a second non-limiting embodiment, said network apparatus NE is a user terminal u. In this case, the attachment method is performed in a distributed way.

It is to be understood that the present invention is non-limiting to the aforementioned embodiments and variations and modifications may be made without departing from the scope of the invention. In the respect, the following remarks are made.

It is to be understood that the present invention is non-limiting to the aforementioned application.

Hence, the present invention has been described for the downlink, but it can be applied to the uplink as described hereinafter.

2. Uplink

What has been above-described in the downlink part description (the fifth steps, the Gibbs sampler, the network apparatus . . . ) applies to the uplink in the same manner.

In the following, for concision purpose, only the differences between the downlink and the uplink are described and for sake of clarity few paragraphs described in the downlink part description are reminded.

As mentioned in the downlink part description, the user transmission delay is the inverse of user throughput. Throughput is defined from the SINR according to:

$$r_u = K \log_e(1 + SINR),$$

where K is a constant.

The user-base station association probability to associate a user to a base station is equal to $$\frac{\exp(-C_u^w(b)/T)}{\sum_b \exp(-C_u^w(b)/T)},$$

where:
- b is the set of the neighboring base stations for said user;
- $C_u^w(b)$ is the local cost function considered at said user terminal when said user is associated with said base station;
- T is a parameter which is either a constant or decreases in time.

The global cost function, which is the network's weighted aggregate transmission delay, is defined as:

$$C^w = \sum_{u \in U} \frac{W_u(X)}{e^{\frac{r_u}{K}} - 1}$$

$$= \sum_{u \in U} \frac{W_u(X)}{SINR_u}$$

where, for a user terminal u and a base station b, the SINR at u is expressible as, for uplink:

$$SINR_u = \frac{P_u \cdot l(u, b_u)}{N_u + \sum_{v \in u, v \neq u} \gamma(v, u) P_v \cdot l(v, b_u)}$$

where:
- U is the set of user terminals u which are served by a set of base stations b of the cellular radio network NTW;
- $b_u$ is the serving base station of user terminal u;
- $P_u$ is the transmission power of the user terminal u;
- $l(u, b_u)$ is the path loss of the transmission from the user terminal u to the base station $b_u$;
- $N_u$ is the thermal noise at the receiver in the base station ($b_u$) for user terminal u (also called as receiver noise);
- $\gamma(v, u) P_v \cdot l(v, b_u)$ is the interference due to the transmission of user terminal v applying on the signal transmitted by user terminal u (which is destined to $b_u$).

By substituting the above $SINR_u$ expression into $C^w$, one obtains, for uplink:

$$C^w = \sum_{u \in u} W_u(X) \frac{N_u + \sum_{v \in u, v \neq u} \gamma(v, u) P_v \cdot l(v, b_u)}{P_u \cdot l(u, b_u)}$$

$$= \sum_{u \in u} \frac{W_u(X) \cdot N_u}{P_u \cdot l(u, b_u)} +$$

$$\sum_{(u,v) \subseteq u} \left( \frac{W_u(X) \cdot \gamma(v, u) P_v \cdot l(v, b_u)}{P_u \cdot l(u, b_u)} + \frac{W_v(X) \cdot \gamma(u, v) P_u \cdot l(u, b_v)}{P_v \cdot l(v, b_v)} \right)$$

Where:
- $\gamma(v, u)$ is the orthogonality factor on the transmission signal destined to the other terminal v;
- $P_v \cdot l(v, b_u)$ is the power of interference received at the base station (which is the receiver) of user terminal u due to the transmission signal of user terminal v.

The user terminal's characteristic is grade of service and/or the user terminal's velocity.

For uplink, the local cost function is equal to:

$$C_u^w(b) = \frac{W_u(X)}{P_u}\left(\frac{N_u}{l(u,b)} + \sum_{v \neq u}\frac{\gamma(v,u)P_v \cdot l(v,b_u)}{l(u,b)}\right) + P_u\left(\sum_{v \neq u}\frac{W_v(X)\gamma(u,v)l(u,b_v)}{P_v \cdot l(v,b_v)}\right)$$

Where:
- $W_u(X)$ is the weighting factor associated to said user terminal u;
- $W_v(X)$ is the weighting factor associated to another user terminal v;
- $N_u$ is the thermal noise at the base station b of said user terminal u (also called as receiver noise);
- $l(u,b)$ is the path loss of the transmission from the user terminal u to the base station b;
- $P_u$ is the transmission power of the user terminal u;
- $\gamma(v,u) \cdot P_v \cdot l(v,b)$ is the interference due to the transmission of the other user terminal v applying on the signal transmitted by said user terminal u;
- $\gamma(u,v)$ is the orthogonality factor between the user terminal u and the other user terminal v;
- $l(u,b_v)$ is the path loss of the transmission from the user terminal u to the base station $b_v$ which the other user terminal v is attached to; and
- $P_v \cdot l(v,b_v)$ is the power of the signal received at the base station b which is transmitted by the other user terminal v.

It is to be noted that the user terminal v could be any user terminal including u.

As mentioned in the downlink part description, in non-limiting embodiments, one or a plurality of characteristics X are taken into account.

Characteristic X is a Grade of Service.

In a first non-limiting embodiment, the characteristic X is a grade of service Q. In variants of this non-limiting embodiment, the grade of service Q is a data rate or the jitter.

What has been described in the downlink part description in the corresponding paragraph, applies here.

Characteristic X is the User Terminal's Velocity S

In a second non-limiting embodiment, the characteristic X is a user terminal's velocity S.

What has been described in the downlink part description in the corresponding paragraph, is applies here.

As mentioned in the downlink part description, one defines a local cost function $C_u^w$ for each user terminal u from said global cost function $C^w$, said local cost function $C_u^w$ taking into account said user terminal's context weighting factor $W_u$ for each user terminal u, and being a function of the base station to which this user terminal is associated.

One defines the following local cost function $C_u^w(b)$ for each user terminal u such that, for uplink:

$$C_u^w(b) = \frac{W_u(X)}{P_u}\left(\frac{N_u}{l(u,b)} + \sum_{v \neq u}\frac{\gamma(v,u)P_v \cdot l(v,b)}{l(u,b)}\right) + P_u\left(\sum_{v \neq u}\frac{W_v(X)\gamma(u,v)l(u,b_v)}{P_v \cdot l(v,b_v)}\right)$$

which is a function of b, where the first term can be seen as the "selfish" part of the energy or cost which is small if the SINR of the signal transmitted by user terminal u received at said base station b is large while the second term can be seen as the "altruistic" part of the energy or cost, which is small if the power of interference incurred by all the other transmissions (i.e. v≠u) because of u is small compared to the power received at their own base stations.

Characteristic X is a Grade of Service.

When the characteristic X is a grade of service Q, one defines a local cost function $C_u^w$ such that, for uplink:

$$C_u^w(b) = \frac{W_u(Q)}{P_u}\left(\frac{N_u}{l(u,b)} + \sum_{v \neq u}\frac{\gamma(v,u)P_v \cdot l(v,b)}{l(u,b)}\right) + P_u\left(\sum_{v \neq u}\frac{W_v(Q)\gamma(u,v)l(u,b_v)}{P_v \cdot l(v,b_v)}\right)$$

which corresponds to the global cost function:

$$C_1^w = \sum_{u \in U}\frac{W_u(Q)}{e^{r_u/K} - 1}$$

Characteristic X is the User Terminal's Velocity S

When the characteristic X is the user terminal's velocity S, one defines a local cost function $C_u^w$ such that, for uplink:

$$C_u^w(b) = \frac{W_u(S)}{P_u}\left(\frac{N_u}{l(u,b)} + \sum_{v \neq u}\frac{\gamma(v,u)P_v \cdot l(v,b)}{l(u,b)}\right) + P_u\left(\sum_{v \neq u}\frac{W_v(S)\gamma(u,v)l(u,b_v)}{P_v \cdot l(v,b_v)}\right)$$

which corresponds to the global cost function:

$$C_2^w = \sum_{u \in U}\frac{W_u(S)}{e^{r_u/K} - 1}$$

Of course, in a non-limiting embodiment, the characteristics Q and S may be combined together, such that:

$$C_u^w(b) = \frac{W_u(Q)W_u(S)}{P_u}\left(\frac{N_u}{l(u,b)} + \sum_{v \neq u}\frac{\gamma(v,u)P_v \cdot l(v,b)}{l(u,b)}\right) + P_u\left(\sum_{v \neq u}\frac{W_u(Q)W_v(S)\gamma(u,v)l(u,b_v)}{P_v \cdot l(v,b_v)}\right)$$

which corresponds to the global cost function:

$$C_3^w = \sum_{u \in U}\frac{W_u(Q)W_u(S)}{e^{r_u/K} - 1}$$

One runs a Gibbs sampler with said local cost function $C_u^w$ for producing user-base station association probabilities.

$$C_u^w(b) = \frac{W_u(X)}{P_u}\left(\frac{N_u}{l(u,b)} + \sum_{v \neq u}\frac{\gamma(v,u)P_v \cdot l(v,b)}{l(u,b)}\right) + P_u\left(\sum_{v \neq u}\frac{W_v(X)\gamma(u,v)l(u,b_v)}{P_v \cdot l(v,b_v)}\right)$$

Through information exchange between neighboring base stations, the local cost function $C_u^w(b)$ to determine $\pi_u(b)$ are evaluated as follows. A state transition is based on the local cost function $C_u^w(b)$. So, in uplink, the base stations need to gather some information to determine the coefficients of $C_u^w(b)$. To do so, each user $v \in U$ reports its $P_v$ value to its base station $b_v$ which (the information) would be exchanged among neighboring base stations. By which, the base stations can estimate the coefficients of $C_u^w(b)$, i.e., the path loss values in order to determine $\pi_u(b)$.

Hence, the present invention has been described for heterogeneous base stations such as of the type of small cells and macro cells, but it can applied to the case of homogeneous base stations (for example a network of small cells).

It is to be understood that the present invention is non-limiting to the aforementioned embodiments.

Hence, other network apparatus NE than the base station b or the user terminal u may be used. For examples, in a centralized implementation of the attachment method, the network apparatus NE may be:

- an administrative owner AO which is a third party independent from the operators;
- a Network Management System, NMS; or
- an Operational Support System, OSS.

It is to be understood that the methods and the elements according to the invention are non-limiting to any implementation.

Thus, in a non-limiting embodiment, one may use binary encoding (and then use $\log_2$ in the Shannon formula) such that the global cost function $C^w$ is defined as:

$$C^w = \sum_{u \in U}\frac{1}{2^{\frac{r_u}{K}} - 1} = \sum_{u \in U}\frac{1}{SINR_u} \quad [4]$$

There are numerous ways of implementing functions of the attachment method by means of items of hardware or software, or both, provided that a single item of hardware or software can carry out several functions. It does not exclude that an assembly of items of hardware or software or both carry out a function. For example, the step of building a path may be combined with the step of updating an associated set of words, thus forming a single function without modifying the building method M in accordance with the invention.

Said hardware or software items can be implemented in several manners, such as by means of wired electronic circuits or by means of a computer program product that is suitable programmed respectively. A computer program product PG can be contained in a computer or in a network apparatus NE, said NE comprising a unit control UC, said unit control being hardware or software items as above stated.

The computer program product PG comprises a first set of instructions.

Thus, said set of instructions contained, for example, in a computer programming memory or in a network apparatus NE, may cause the computer or the network apparatus NE to carry out the different steps of the attachment method.

The set of instructions may be loaded into the programming memory by reading a data carrier such as, for example, a disk. A service provider can also make the set of instructions available via a communication network such as, for example, the Internet.

Hence, some embodiments of the invention may comprise one or a plurality of the following advantages:

The attachment method (also called user association procedure) optimizes the association/attachment of the users among the available base stations within a given geographical area in a distributed way while taking into account the user context (such as the target service and the mobile velocity) as well as the characteristics of the surrounding cells so as to minimize the overall transmission delay and overhead due to handoffs.

The optimization is conducted with the user terminal's context characteristic such as the grade of service (e.g., target/expected data rate).

The optimization is conducted with respect to the user terminal's velocity and the type of surrounding cells covering the geographic area which may bring handoffs. The resulting optimization is to minimize the overall transmission delay and overhead due to the handoffs.

Therefore, it enables the mobile terminal to exchange data with the base station in the context of more and more complex and heterogeneous networks.

Therefore, it offers better quality of service for each user terminal, especially in the context of heterogeneous networks and taking into account the user context.

Therefore, it optimizes the user association procedure with a multitude of base stations (e.g. macro and small cells).

Therefore, the invention tackles the problem of new (emerging) networks with heterogeneous type of base stations, consisting of macro and small cell base station.

- it permits to determine the best base station to which a user terminal is attached in distributed way and such that it optimizes the overall functioning of the network (including multi-layer networks);
- it avoids (if wanted) having a centralized coordinator to compute the global function cost. It is based on local measurements and limited information exchange and can adaptively drive the system to a state of global optimal configuration. Therefore it avoids huge exchange of data information in the network and a centralized user-association method with high complexity;
- it does not only provide system throughput enhancement but also support fair bandwidth sharing among the users in the network. Therefore, it permits to have a user-association procedure which is relevant for large scale wireless networks;
- it permits to find the optimal (minimal) point of the (network/global) cost function which may have multiple local optimal points where other methods well-known by the man skilled in the art (e.g. hill climbing approaches) may find a less optimal point.
- it applies to downlink and to uplink.

Any reference sign in the following claims should not be construed as limiting the claim. It will be obvious that the verb "to comprise" and its conjugations do not exclude the presence of any other steps or elements beside those defined in any claim. The word "a" or "an" preceding an element or step does not exclude the presence of a plurality of such elements or steps.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for attaching a user terminal to a base station in a network, said method comprising:
   defining a global cost function ($C^w$) representative of an aggregate transmission delay for a set of user terminals served by a set of base stations in a network, the aggregate transmission delay including a weighted transmission delay for each user terminal (u) in the user terminal set, the weighted transmission delay based at least in part on a context weighting factor ($W_u(X)$) applying at least one select weighting ($W_u$) to at least one select characteristic (X) of the corresponding user terminal (u);
   defining a local cost function ($C_u^w$) for each user terminal (u) in the user terminal set from said global cost function ($C^w$), said local cost function ($C_u^w$) taking into account said context weighting factor ($W_u(X)$) for the corresponding user terminal (u) and being a function of a base station (b) of the base station set to which the corresponding user terminal (u) is associated;
   running a Gibbs sampler with said local cost function ($C_u^w$) for each user terminal (u) of the user terminal set to produce a user-base station association probability ($\pi_u(b)$) for each user terminal (u) of the user terminal set with at least one base station (b) of the base station set;
   choosing the user-base station association probability ($\pi_u(b)$) which favors low local cost for each user terminal (u) of the user terminal set; and
   attaching each user terminal (u) of the user terminal set to the corresponding base station (b) of the base station set according to the user-base station association probability ($\pi_u(b)$) chosen for the corresponding user terminal (u).

2. The method according to claim 1, wherein the user weighted transmission delay for each user terminal (u) in the user terminal set is based at least in part on an inverse of throughput ($r_u$) for the corresponding user terminal (u).

3. The method according to claim 2, wherein said throughput ($r_u$) for the corresponding user terminal (u) is defined from a Signal to Interference plus Noise Ratio (SINR) according to a Shannon capacity formula which is equal to:

$$r_u = K \log_e(1 + SINR_u),$$

where K is a constant.

4. The method according to claim 1, wherein the user-base station association probability ($\pi_u(b)$) is equal $$\frac{\exp(-C_u^w(b)/T)}{\sum_b \exp(-C_u^w(b)/T)},$$

where:
   b is the corresponding base station of the base station set for said corresponding user terminal (u);
   $C_u^w(b)$ is the local cost function for said corresponding user terminal (u) when said corresponding user terminal (u) is associated with said corresponding base station (b); and
   T is a parameter which is either a constant or decreases in time.

5. The method according to claim 4, wherein the parameter T decreases in time and is equal to $T_0/\ln(1+t)$, where t is the time and $T_0$ is a constant.

6. The method according to claim 1, wherein the running of the Gibbs sampler for each user terminal (u) of the user terminal set starts with an arbitrary initial state with said corresponding user terminal (u) attached to any one of the base stations (b) of the base station set from which a signal above a specified power threshold was received by the corresponding user terminal (u).

7. The method according to claim 1, wherein the at least one characteristic (X) includes a grade of service (Q) for the corresponding user terminal (u) and/or a velocity (S) for the corresponding user terminal (u).

8. The method according to claim 7, wherein the grade of service (Q) is a data rate for the corresponding user terminal (u) and/or jitter for the corresponding user terminal (u).

9. The method according to claim 1, wherein at least one characteristic (X) includes a velocity (S) for the corresponding user terminal (u) and the context weighting factor ($W_u(X)$) for the corresponding user terminal (u) takes into account the velocity (S) for the corresponding user terminal (u) takes and types of surrounding cells (Cl).

10. The method according to claim 1, wherein the context weighting factor ($W_u(X)$) is defined as being function of:
   a handoff frequency ($f_{HO}$) of the corresponding user terminal (u), said handoff frequency depending on a velocity (S) of the corresponding user terminal (u), a cell density ($cl_d$) over a geographic area corresponding to the network, and a cell radius ($cl_r$); and
   a time taken ($T_{HO}$) by each handoff of the corresponding user terminal (u).

11. The method according to claim 1, wherein the local cost function ($C_u^w$) is equal to:

$$C_u^w(b) = \frac{W_u(X)}{P_u}\left(\frac{N_u}{l(b,u)} + \sum_{v \neq u} \frac{\gamma(v,u)P_v \cdot l(b_v,u)}{l(b,u)}\right) + P_u\left(\sum_{v \neq u} \frac{W_v(X)\gamma(u,v)l(b,v)}{P_v \cdot l(b_v,v)}\right)$$

where:
   $W_u(X)$ is the context weighting factor for said corresponding user terminal (u);
   $W_v(X)$ is the context weighting factor for another user terminal (v);
   $N_u$ is thermal noise at the corresponding user terminal (u);
   $l(b,u)$ is path loss of transmissions from the corresponding base station (b) to the corresponding user terminal (u);
   $P_u$ is transmission power for the corresponding user terminal (u);
   $\gamma(v,u) \cdot P_v \cdot l(b_v,u)$ is interference at the corresponding user terminal (u) from transmissions destined to the other user terminal (v);
   $\gamma(u,v)$ is an orthogonality factor between the corresponding user terminal (u) and the other user terminal (v);
   $l(b,v)$ is path loss of transmissions from the corresponding base station b to the other user terminal (v); and
   $P_v \cdot l(b_v,v)$ is transmission power of a signal from another base station ($b_v$) received at the other user terminal (v), where said other user terminal (v) is attached to the other base station ($b_v$).

12. The method according to claim 1, wherein the local cost function ($C_u^w$) is equal to:

$$C_u^w(b) = \frac{W_u(X)}{P_u}\left(\frac{N_u}{l(u,b)} + \sum_{v \neq u} \frac{\gamma(v,u)P_v \cdot l(v,b)}{l(u,b)}\right) + P_u\left(\sum_{v \neq u} \frac{W_v(X)\gamma(u,v)l(u,b_v)}{P_v \cdot l(v,b_v)}\right)$$

Where:
- $W_u(X)$ is the context weighting factor for said corresponding user terminal (u);
- $W_v(X)$ is the context weighting factor for another user terminal (v);
- $N_u$ is thermal noise at the corresponding base station (b) of said corresponding user terminal (u);
- l(u,b) is path loss of transmissions from the corresponding user terminal (u) to the corresponding base station (b);
- $P_u$ is transmission power of the corresponding user terminal (u);
- $\gamma(v,u)P_v \cdot l(v,b)$ is interference due to transmissions of the other user terminal (v) on signals transmitted by said corresponding user terminal (u);
- $\gamma(u,v)$ is an orthogonality factor between the corresponding user terminal (u) and the other user terminal (v);
- $l(u,b_v)$ is path loss of transmissions from the corresponding user terminal (u) to another base station ($b_v$) to which the other user terminal (v) is attached; and
- $P_v \cdot l(v,b_v)$ is transmission power of a signal from the other user terminal (v) received at the other base station ($b_v$).

13. The method according to claim 1, wherein the method is performed in a distributed way at each user terminal (u) of the user terminal set or in a centralized way in one or more base station (b) of the base station set.

14. A network apparatus for attaching a user terminal to a base station in a network, said network apparatus being configured to:
- define a global cost function ($C^w$) which is representative of an aggregate transmission delay for a set of user terminals served by a set of base stations in a network, the aggregate transmission delay including a weighted transmission delay for each user terminal (u) in the terminal set, the weighted transmission delay based on a context weighting factor ($W_u(X)$) applying at least one select weighting ($W_u$) to at least one select characteristic (X) of the corresponding user terminal (u);
- define a local cost function ($C_u^w$) for each user terminal (u) in the user terminal set from said global cost function ($C^w$), said local cost function ($C_u^w$) taking into account said context weighting factor ($W_u(X)$) for the corresponding user terminal (u) and being a function of a base station (b) of the base station set to which the corresponding user terminal (u) is associated;
- run a Gibbs sampler with said local cost functions ($C_u^w$) for each user terminal (u) of the user terminal set to produce a user-base station association probability ($\pi_u(b)$) for each user terminal (u) of the user terminal set with at least one base station (b) of the base station set;
- choose the user-base station association probability ($\pi_u(b)$) which favors low local cost for each user terminal (u) of the user terminal set; and
- attach each user terminal (u) of the user terminal set to the corresponding base station (b) of the base station set according to the user-base station association probability ($\pi_u(b)$) chosen for the corresponding user terminal (u).

15. The network apparatus according to claim 14, wherein said network apparatus is at least one base station from the base station set.

16. The network apparatus according to claim 14, wherein said network apparatus is at least one user terminal from the user terminal set.

17. The network apparatus according to claim 14, wherein the at least one characteristic (X) includes a grade of service (Q) for the corresponding user terminal (u) and/or a velocity (S) for the corresponding user terminal (u);
wherein the grade of service (Q) is a data rate for the corresponding user terminal (u) and/or jitter for the corresponding user terminal (u).

18. The network apparatus according to claim 14, wherein the at least one characteristic (X) includes a velocity (S) for the corresponding user terminal (u) and the context weighting factor ($W_u(X)$) for the corresponding user terminal (u) takes into account the velocity (S) for the corresponding user terminal (u) takes and types of surrounding cells (Cl).

19. The network apparatus according to claim 14, wherein the context weighting factor ($W_u(X)$) is defined as being function of:
- a handoff frequency ($f_{HO}$) of the corresponding user terminal (u), the handoff frequency depending on a velocity (S) of the corresponding user terminal (u), a cell density ($cl_d$) over a geographic area corresponding to the network, and a cell radius ($cl_r$); and
- a time taken ($T_{HO}$) by each handoff of the corresponding user terminal (u).

20. A non-transitory computer-readable medium storing program instructions, which when executed by a computer, cause a computer-controlled network apparatus to carry out a method for attaching a user terminal to a base station in a network, the method comprising:
- defining a global cost function ($C^w$) representative of an aggregate transmission delay for a set of user terminals served by a set of base stations in a network, the aggregate transmission delay including a weighted transmission delay for each user terminal (u) in the user terminal set, the weighted transmission delay based at least in part on a context weighting factor ($W_u(X)$) applying at least one select weighting ($W_u$) to at least one select characteristic (X) of the corresponding user terminal (u);
- defining a local cost function ($C_u^w$) for each user terminal (u) in the user terminal set from the global cost function ($C^w$), the local cost function ($C_u^w$) taking into account the context weighting factor ($W_u(X)$) for the corresponding user terminal (u) and being a function of a base station (b) of the base station set to which the corresponding user terminal (u) is associated;
- running a Gibbs sampler with the local cost function ($C_u^w$) for each user terminal (u) of the user terminal set to produce a user-base station association probability ($\pi_u(b)$) for each user terminal (u) of the user terminal set with at least one base station (b) of the base station set;
- choosing the user-base station association probability ($\pi_u(b)$) which favors low local cost for each user terminal (u) of the user terminal set; and
- attaching each user terminal (u) of the user terminal set to the corresponding base station (b) of the base station set according to the user-base station association probability ($\pi_u(b)$) chosen for the corresponding user terminal (u).

* * * * *